(12) United States Patent
Fukuhori et al.

(10) Patent No.: US 6,547,853 B2
(45) Date of Patent: Apr. 15, 2003

(54) CIRCULATING CONDENSATION TREATMENT OF DRY DEHUMIDIFIER REGENERATING GAS

(75) Inventors: Shinji Fukuhori, Kanagawa (JP); Keiichiro Kametani, Osaka (JP)

(73) Assignee: Fuji Photo Film, Co., Ltd., Kanagawa (JP)

( * ) Notice: Subject to any disclaimer, the term of this patent is extended or adjusted under 35 U.S.C. 154(b) by 0 days.

(21) Appl. No.: 09/873,277

(22) Filed: Jun. 5, 2001

(65) Prior Publication Data

US 2002/0035923 A1 Mar. 28, 2002

(30) Foreign Application Priority Data

Jun. 5, 2000 (JP) .......................... 2000-167714
May 18, 2001 (JP) .......................... 2001-149605

(51) Int. Cl.$^7$ .............................................. B01D 53/26
(52) U.S. Cl. ........................... 95/113; 95/114; 95/124; 95/141
(58) Field of Search ................. 95/113, 114, 115, 95/117, 120, 121, 122, 123, 124, 141; 34/332, 80; 96/122, 123, 125

(56) References Cited

U.S. PATENT DOCUMENTS

| 4,409,006 A | * | 10/1983 | Mattia .................... 95/113 |
| 5,170,633 A | * | 12/1992 | Kaplan .................... 62/271 |
| 5,547,491 A | * | 8/1996 | Berwian et al. ............ 95/106 |
| 5,701,762 A | * | 12/1997 | Akamatsu et al. .......... 62/636 |
| 5,702,505 A | * | 12/1997 | Izumi et al. ................. 95/113 |
| 5,746,788 A | * | 5/1998 | Schmidt et al. ........... 48/198.2 |
| 6,083,304 A | * | 7/2000 | Fujimura .................... 95/113 |

FOREIGN PATENT DOCUMENTS

| JP | 05-115736 | 5/1993 |
| JP | 05-200233 | 8/1993 |
| JP | 06-000320 | 1/1994 |
| JP | 06-031132 | 2/1994 |
| JP | 06-063345 | 3/1994 |
| JP | 06-343817 | 12/1994 |
| JP | 06-343818 | 12/1994 |
| JP | 06-343819 | 12/1994 |

* cited by examiner

Primary Examiner—David A. Simmons
Assistant Examiner—Frank M. Lawrence
(74) Attorney, Agent, or Firm—Young & Thompson

(57) ABSTRACT

A method for removing moisture from gas containing vapor of a solvent using a dry dehumidifier, includes removing moisture from at least a part of dehumidifier regenerating outlet gas and reusing the dehumidified gas as regenerating gas. Reuse of partial gas on the regenerating outlet side makes it possible to condense efficiently vapor of a solvent contained in exhaust gas as dehumidification is continued, to produce small quantity of high concentration gas thereby, and in case of making removal treatment of vapor of a solvent to miniaturize an apparatus for this purpose as well as to reduce prominently costs required for equipments and others.

16 Claims, 3 Drawing Sheets

US 6,547,853 B2

CIRCULATING CONDENSATION TREATMENT OF DRY DEHUMIDIFIER REGENERATING GAS

FIELD OF THE INVENTION

This invention relates to a novel method for circulating condensation treatment of a regenerating gas in a dry dehumidifier, in particular to a method for removing moisture from gas (air or the like) to be dehumidified containing vapor of a solvent. Particularly, the method comprises the following steps. Namely, at least a part of regenerating outlet gas of the dehumidifier containing a mixture of moisture and vapor of a solvent transited from dehumidified gas is subjected to dehumidification treatment with regard to the moisture contained therein before reusing it as regenerating gas. Preferably, a part of the regenerating outlet side gas is exhausted out and the solvent vapor contained therein is subjected to removal treatment. This makes it possible to increase the vapor concentration of the regenerating gas as well as to miniaturize a gas treating apparatus in case of treating the gas. Further, in case of treating the gas by combustion system, it contributes to the reduction of fuel use.

BACKGROUND

As a device for reducing moisture contained in gas such as air and feeding dried gas (air) to its using environment, a dry dehumidifier is used and various types of dry dehumidifiers are proposed.

This dry dehumidifier is a device for removing or reducing moisture contained in, e.g., air by bringing this air into contact with dehumidifying materials by utilizing their water-absorbing ability, and the dry dehumidifier is being used widely for dehumidifying gas from low humidity to high humidity.

A dry dehumidifier, as illustrated in FIG. 1, is generally used for dehumidifying moist gas. As regenerating gas used herein, hot air is produced by heating the outside air. This hot air dries a moist dehumidifying rotor. Regenerating outlet gas (air) gets mixed with water discharged by the dehumidifying rotor to be moistened air. This regenerating outlet gas (air) is conventionally discharged as it is into the air.

In case of using a dry dehumidifier for drying equipment and the like and gas to be dehumidified containing vapor of a solvent (gas to be treated) such as air containing the solvent vapor, it is also generally known that moisture as well as the solvent vapor transits from the dehumidifier treating air side to the dehumidifier regenerating gas side (air side). In this case, the dehumidifier plays two roles of removing moisture and removing vapor of a solvent both of which are contained in gas to be treated (air or the like to be treated).

It is proposed for the purpose of improving the performance of the dehumidifier to make a purging zone or to divide a regenerating zone (cf., e.g., JP-A Nos. 6-320/1994, 5-115736/1993, 5-200233/1993, 6-31132/1994, 6-63345/1994, 6-343817/1994 and 6-343818/1994 (The term "JP-A" used herein means unexamined laying open of Japanese patent application called "Kokai-Publication").

SUMMARY OF THE DISCLOSURE

Commonly in these prior art systems, moistened regenerating outlet air is discharged as it is out into the atmosphere.

In such systems, in case that vapor of a solvent is contained in gas to be treated that should be dehumidified, the solvent vapor transited to the regenerating gas (air) side without removal treatment is discharged into the air together with water.

In recent years, in order to prevent air pollution, it is necessary to remove a solvent contained in the aforementioned dehumidifier regenerating outlet air before discharging it into the atmosphere.

For removing vapor of solvent, a method of introducing the regenerating outlet gas (air) into a device for removing vapor of a solvent is generally applied. With regard to the kind of the devices, there are a lot of systems such as combustion system, absorbing recovery system, cooling recovery system, scrubber system, bio-filtration system and the like.

However, in case of using dehumidifiers of large size, a large-sized device for removing vapor of a solvent (apparatus for treating exhaust gas) is necessary because the quantity of regenerating gas (air or the like) is large, so that huge equipment costs are required.

In case of applying combustion systems (including a Regenerative Thermal Oxidizer) to the exhaust gas treatment apparatus, auxiliary fuel is necessary because the concentration of gas to be treated is dilute, so that there are many cases that running cost becomes high.

There is also a method for condensing the regenerating outlet gas by a dilute gas condensation apparatus (with a zeolite rotor or the like used therein), but this method consumes a lot of energies for removing water because of high humidity, and accordingly running cost becomes high. Further, there is a drawback that many of inferior gases in adsorption efficiency (such as methanol or the like) are discharged into the atmosphere passing through condensers.

Under such circumstances, in case of removing moisture contained in gas to be treated in which vapor of a solvent is contained and which should be dehumidified using a dry dehumidifier, there is much desired in the art to develop an improved method, which enables efficiently the removal treatment of moisture and vapor transited into and thereby contained in the regenerating outlet gas, consequently using small-scale equipments and reducing the treatment costs.

It is an object of the present invention to provide a method enabling the removal treatment of moisture and vapor of a solvent efficiently at low costs with small-scale equipments. Particularly, it is an object of the present invention to provide a method for removing moisture and solvent vapor, from a gas flow containing water and the solvent vapor transited into dehumidifier regenerating outlet gas on the occasion of removing water contained in gas, using a dry dehumidifier.

The present inventors studied assiduously in order to solve the above-described problems, and consequently found that the vapor of a solvent contained in exhaust gas can be condensed efficiently to produce condensed gas of small quantity by circulating and reusing gas regenerated in a dehumidifier such as air used for regenerating gas under specific treating conditions, and thereby made it possible to miniaturize an apparatus for treating vapor of a solvent (exhaust gas) and to reduce totally equipment costs and running cost. The water circulated in the gas regenerating in the dehumidifier and contained in the recycled gas (air or the like) can be removed by cooling dehumidifier or the like. The solvent vapor contained in the exhaust gas can be condensed, sent to an apparatus for treating exhaust gas and treated therein.

According to an aspect of the present invention, there is provided a method for removing moisture from gas containing vapor of a solvent using a dry dehumidifier, said vapor of a solvent in the regenerating gas is simultaneously condensed, comprising the steps of removing moisture from at least a part of regenerating outlet gas of the dehumidifier, and reusing the dehumidified gas as regenerating gas.

It is possible to restrain increase in the concentration of the solvent in the regenerating gas (air or the like) by adding a small quantity of fresh air. According to another aspect of the present invention, exhaust gas (gas containing condensed vapor of a solvent) can be discharged as condensed gas in the corresponding quantity of the fresh air. Consequently, the discharged gas can be treated at low costs using a small-scale apparatus for treating exhaust gas.

In another embodiment of the present invention, the dry dehumidifier has a purge zone and purging outlet gas is used as regenerating gas.

In a further preferred embodiment of the present invention, at least one tenth of the regenerating outlet gas in quantity is circulated and reused.

PREFERRED EMBODIMENTS OF THE INVENTION

Typical example of the method of present invention will be explained below by focusing on a device shown in FIG. 2. However, this is illustrative of the preferred embodiment of the present invention with regard to the removal of moisture contained in gas containing vapor of a solvent by the use of a dry dehumidifier, and the present invention is never restricted to this example.

Figure 4:
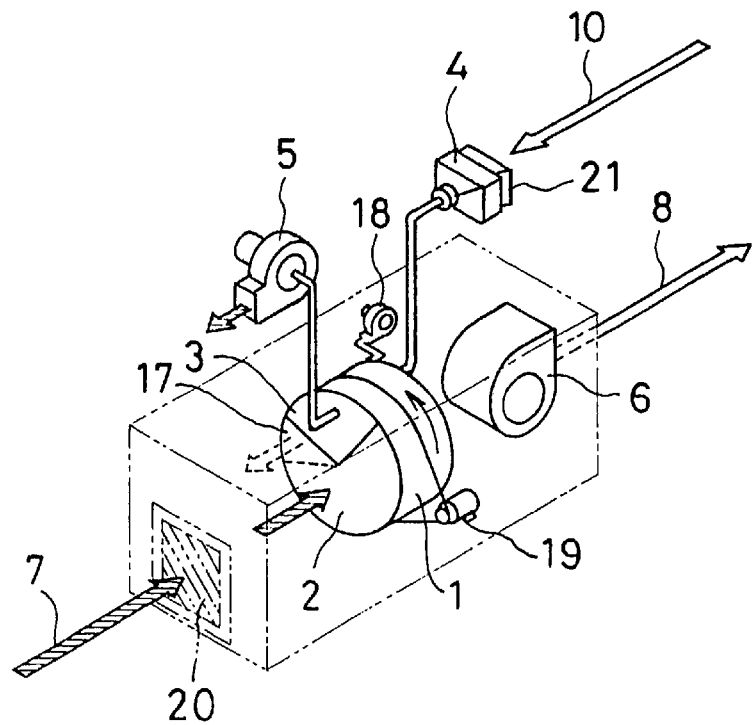
FIG. 4: view showing an exemplary usable dry humidifier in the present invention

A dry dehumidifier used in the present invention is an apparatus for removing or reducing the moisture contained in gas by bringing gas containing moisture into contact with dehumidifying materials by utilizing their water-absorbing ability (cf. FIG. 4), and it does not matter whether it is known (cf. the above-described known literatures) or will be developed in the future if it is available for this purpose.

In case of using a dehumidifying rotor 1 for the apparatus, known materials for it may be used or utilized. Examples of the materials include those utilizing the water-absorbing function of lithium chloride with which glass fibers and the like are impregnated, those utilizing the absorbing function of porous materials such as silica gel and zeolite. Velocities of the dehumidifying rotor 1 are not especially restrictive but those selected and employed in usual range preferably from 1 to 20 rph or so (rotation/hour), more preferably from 8 to 12 rph or so.

As concerns regenerating gas used in the present invention, the dew point of air capable of regenerating a dehumidifying rotor 1 can be maintained by, for instance, circulating the greater part of regenerating air 10 and removing moisture contained in the regenerating air with a cooling dehumidifier (air cooler) 14.

Gas 7 to be treated, which is used in the present invention, is gas containing vapor of a solvent and moisture. Typical gases include air containing organic exhaust gas. When dehumidification treatment is done, moisture-removed, solvent-vapor-removed dry air 8 can be obtained. In regard of the gas to be treated like this and of regenerating gas, the term "dehumidification" used herein means—reducing moisture by removing at least a part of moisture contained in these gases—which may be rephrased as—dehydrating completely or removing a part of moisture—. The term "removal" with regard to vapor of a solvent has the analogous meaning to the above of—removing at least a part of the vapor solvent—. In the aforementioned air cooler, vapor of a solvent contained therein can be partially removed, but most of it is sent after being circulated to an apparatus for exhaust gas treatment 12' and treated thereupon.

"Vapor of a solvent", the term of which is used herein and which is contained in the gas to be treated, consists of one (single) or more (plural) organic component the kind of which is in especial not restrictive and which includes methyl ethyl ketone, acetone, methyl isobutyl ketone, methanol, ethanol, n-propyl alcohol, isopropyl alcohol, butanols, ethyl acetate, toluene, xylene, ether, methylene glycol, methylene glycol monomethyl acetate, methylene glycol monoethyl acetate, methylene glycol monomethyl ether, methylene glycol monoethyl ether, ethylene glycol monomethyl ether, ethylene glycol monoethyl ether, propylene glycol monomethyl ether or the like.

There is no limitation especially concerning the vapor concentration of a solvent contained in the gas to be treated and the present invention can be put into practice pro re nata depending on the main component, the concentration and others of the solvent vapor. In usual, the maximum concentration is preferably around 5,000 ppm, more preferably around 3,000 ppm, and still more preferably around 2,000 ppm.

On the occasion of making the dehumidification treatment of the gas to be treated containing vapor of a solvent, most of the solvent vapor contained therein is transited together with moisture into regenerating gas so that its removal treatment becomes necessary.

In case that the solvent vapor transited into regenerating outlet gas (regenerating outlet air 11) has comparatively high condensation temperature, it is possible to condense and recover the gas with the aforementioned cooling dehumidifier 14.

On the contrary, in case that the solvent vapor has low condensation temperature, a vast amount of cooling energies are required for condensing and treating it with the aforementioned cooling dehumidifier 14, and the performance becomes deteriorated. In this case, the concentration of the solvent vapor contained in the regenerating air becomes increased and the transition of the solvent vapor from the gas to be treated side becomes impossible thereby unless removing the solvent vapor by the application of some method or other. In addition, troubles on explosion-protection will also occur and their measures must be necessary.

Thereupon, dilution with fresh air can be employed as one method. In this case, exhaust air in the corresponding quantity of the fresh air is discharged. Accordingly, this discharged air can be sent to an apparatus for the treatment 12' of vapor of a solvent (exhaust gas).

Appropriate quantity of fresh air (outside air) varies depending on the gas concentration of the gas to be treated. In the present invention, selection of appropriate conditions makes it possible to control the quantity to about one tenth of the whole regenerating air. In this case, the regenerating gas will be tenfold condensed. Namely, the quantity thereof will be reduced to one tenth; and the gas concentration, tenfold increased. The balance of air quantities in this case can be represented by $Q_3=1/10 \times Q_1$; $Q_2+Q_3=Q_1$. As a result, the scale of the apparatus which is used for the succeeding treatment of the solvent vapor (exhaust gas) can be reduced to about one tenth of the conventional one.

As is evident from the above, according to the present invention, the quantity of fresh air, i.e., the quantity of condensed, discharged gas (exhaust gas for treating) can be controlled to about one tenth or more of the whole regenerating gas quantity, and the gas concentration becomes high, so that auxiliary fuel can be reduced in case of making the treatment of exhaust gas in a combustion system. Accordingly, the dehumidification treatment according to the present invention exhibits very good efficiency.

In this way, according to the method of present invention, vapor of a solvent is mixed in the regenerating gas (regenerating outlet air 11 or the like), so that solvent vapor transition becomes deteriorated a little as compared with conventional methods. However, the fact that its extent is on a negligibly low level has been already supported by experiments.

Considering the case that a dehumidifier is solely used, both equipment costs and running cost are estimated high as compared with conventional systems (in which outside air after rising its temperature is used as regenerating air and regenerating outlet air 11 is discharged as it is). However, taking the total system including a subsequent apparatus for exhaust gas treatment into account, substantial reduction of equipment costs and running cost can be realized.

Figure 3:
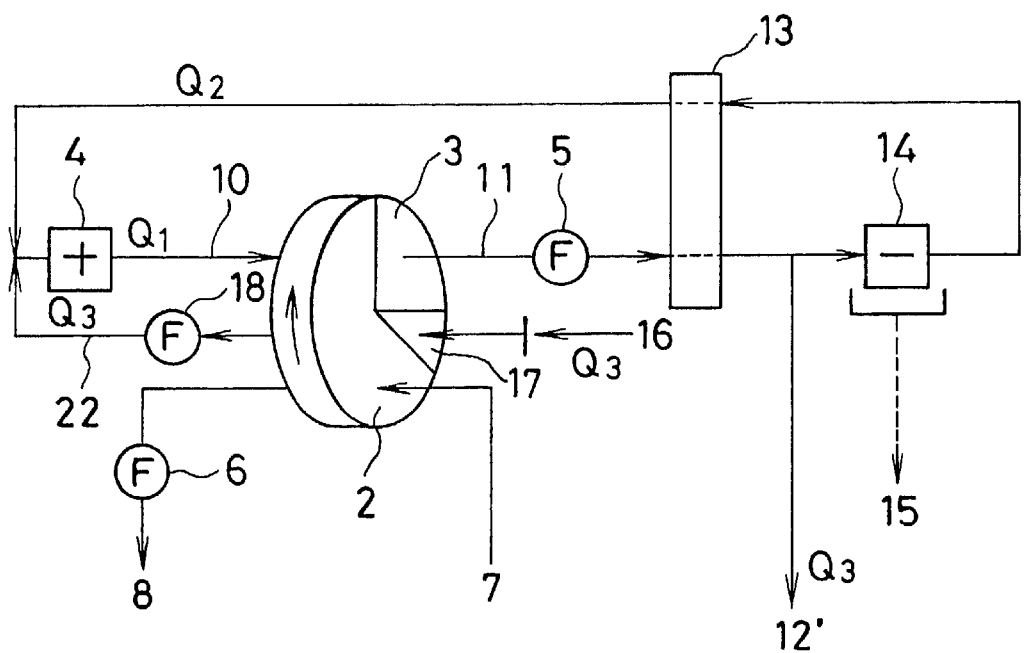
FIG. 3: explanatory view indicating one embodiment of the method of present invention in which a dry dehumidifier having a purging zone is used. In order to heat purge air 16 sent to a purging zone 17, heater can be placed in the midway of a passage for sending the purging air to the purging zone if necessary.

FIG. 3 shows an embodiment of the present invention in which a dry dehumidifier having a purging zone 17 is used. In this embodiment, purging outlet air 22 (purging outlet gas) can be used for outside air 9 (fresh air) for regenerating too. In this case it is possible to control the quantity of fresh air (outside air) to about one tenth of the whole regenerating air. The balance of air quantities in this case also can be represented by $Q_3=1/10 \times Q_1$; $Q_2+Q_3=Q_1$ in the same way as disclosed in the above. Further, it is also possible to contribute to the prevention of lowering the aforementioned transition of the solvent vapor by purging with air having no vapor of a solvent contained therein.

EXAMPLE

The present invention will be explained below more in detail based on the following examples and comparative example.

Example 1

Figure 1:
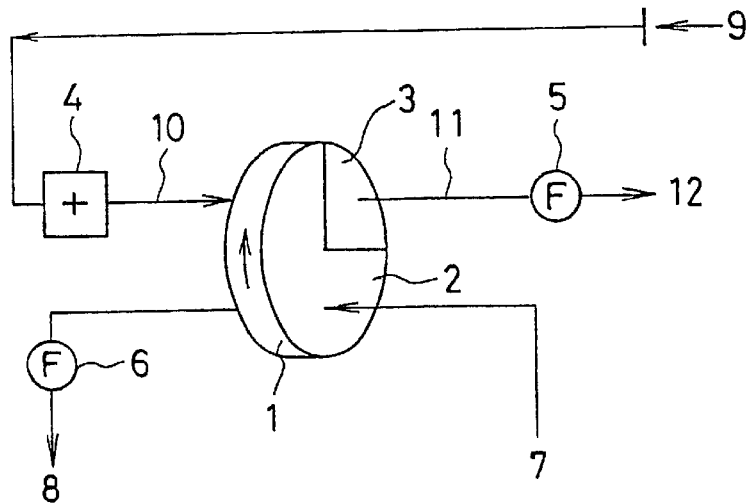
FIG. 1: explanatory view indicating conventional dehumidification method of gas using a dry dehumidifier.
Figure 2:
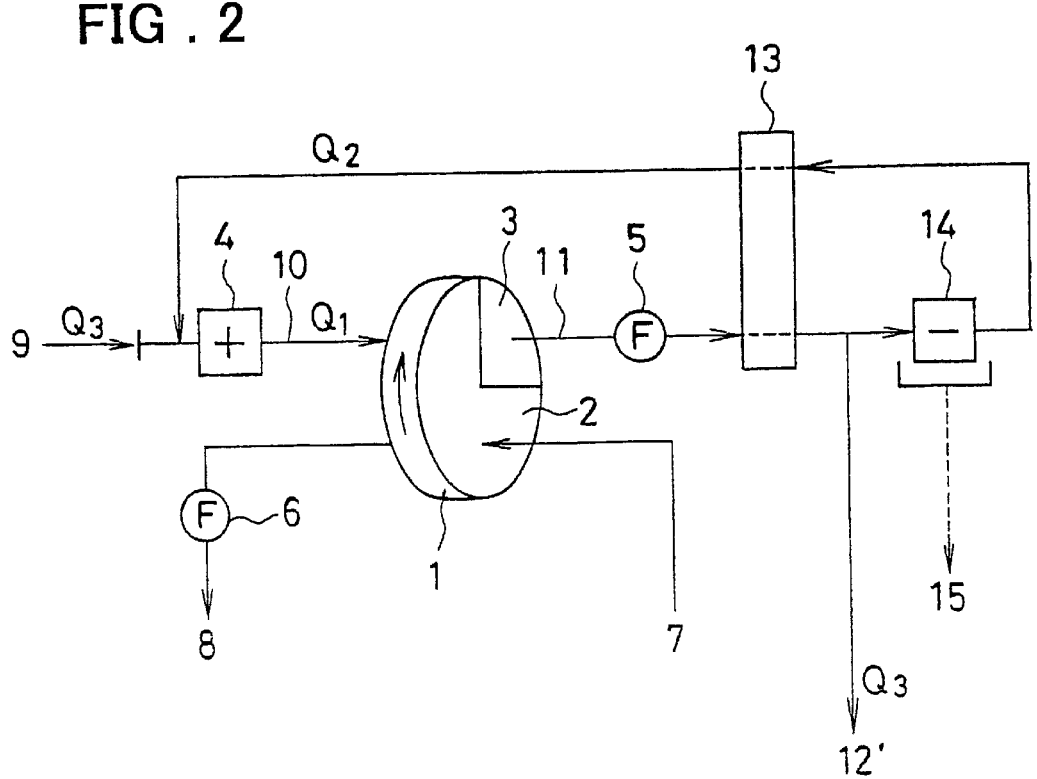
FIG. 2: explanatory view indicating typical dehumidification method of the present invention.

Dehumidification treatment was carried out employing a system for it shown in FIG. 2 and using air as regenerating gas and air containing water and solvent as gas to be treated. Results are shown below. "Condensed, discharged air quantity/regenerating outlet air quantity" indicates the ratio of air quantity ($Q_3$) for exhaust gas treatment 12' to the quantity ($Q_2$) of regenerating outlet air 11. "Inlet for treatment" implies air to be treated (gas 7 to be treated containing water and solvent), and "Outlet of treatment" implies dry air after treatment (dry gas 8). "Condensed, discharged gas" predicates air for exhaust gas treatment 12'. A rotor with lithium chloride coated thereon (8 to 12 rotation per hour) manufactured by Daikin Industries, Ltd. was used for a dehumidifying rotor.

Regenerating gas 10 (on the inlet side) is always kept to have humidity of 14.8 g/kg and temperature of 122° C.

TABLE 1

Case of condensed, discharged air quantity/regenerating outlet air quantity = 1.0
(Comparative Example)

| Measured Item | Inlet for treatment | Outlet of treatment | Condensed exhaust gas |
|---|---|---|---|
| Humidity (g/kg) | 6.0 | 1.6 | 29.5 |
| Temperature (° C.) | 9.8 | 38.1 | — |
| Solvent | | | |
| Methanol (ppm) | 265 | 39 | 632 |
| Ethyl acetate (ppm) | 60 | 12 | 135 |

TABLE 2

Case of condensed, discharged air quantity/regenerating outlet air quantity = 0.5
(Example of the present invention)

| Measured Item | Inlet for treatment | Outlet of treatment | Condensed exhaust gas |
|---|---|---|---|
| Humidity (g/kg) | 5.9 | 1.6 | 23.1 |
| Temperature (° C.) | 9.2 | 35.9 | — |
| Solvent | | | |
| Methanol (ppm) | 316 | 48 | 1277 |
| Ethyl acetate (ppm) | 62 | 11 | 269 |

TABLE 3

Case of condensed, discharged air quantity/regenerating outlet air quantity = 0.12
(Example of the present invention)

| Measured Item | Inlet for treatment | Outlet of treatment | Condensed exhaust gas |
|---|---|---|---|
| Humidity (g/kg) | 5.9 | 1.9 | 25.4 |
| Temperature (° C.) | 9.6 | 34.9 | — |
| Solvent | | | |
| Methanol (ppm) | 307 | 97 | 2848 |
| Ethyl acetate (ppm) | 63 | 31 | 631 |

Figure 5:
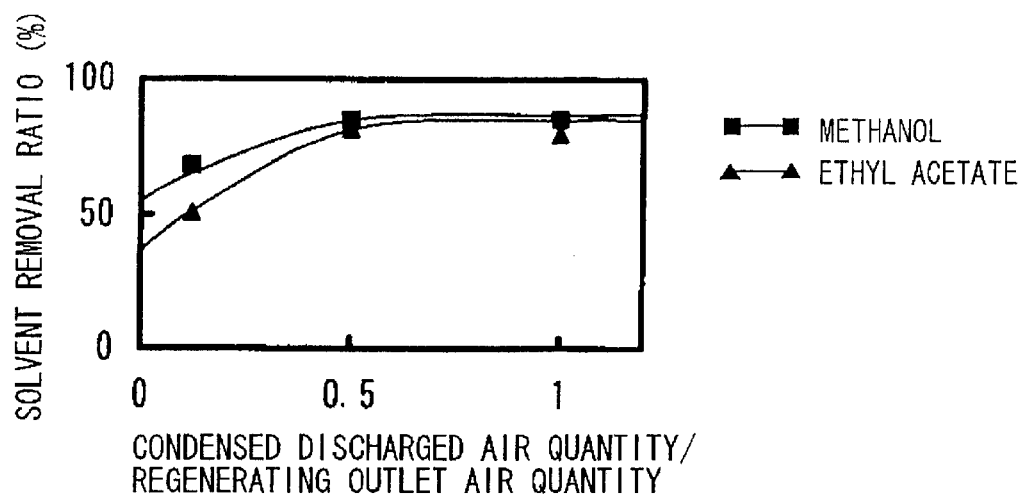
FIG. 5: graph showing the relation of condensed, discharged air quantity/regenerating outlet air quantity to solvent removal ratio of gas to be treated. In this figure, "■" denotes methanol, and "▲" denotes ethyl acetate.
Figure 6:
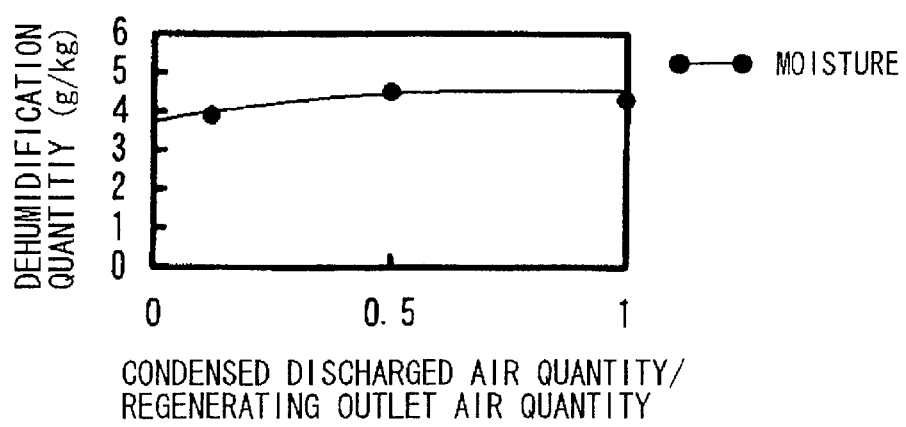
FIG. 6: graph showing the relation of condensed, discharged air quantity/regenerating outlet air quantity to dehumidification quantity of gas to be treated. In this figure, "●" denotes water.

The relation of condensed, discharged air quantity/regenerating outlet air quantity to solvent removal ratio or dehumidification quantity of gas to be treated was determined by Tables 1 to 3. The results are shown in FIGS. 5 and 6. Table 1 shows the result of treatment accompanied by discharging all regenerating outlet air, which corresponds to the dehumidification effect taken by conventional methods.

As is evident from these results, it will be understood that dehumidification effects can be maintained even if a part of the regenerating outlet air is circulated and reused as regenerating gas, and notably that dehumidification treatment effect can be maintained within admissible ranges, i.e., substantially to such an extent that corresponds to the conventional dehumidification effect (Table 1) even if exhaust gas quantity for treating is almost equivalent to one tenth of the regenerating outlet gas.

Example 2

Dehumidification treatment was carried out in the same manner as disclosed in Example 1 except using a dry dehumidifier having a purging zone as shown in FIG. 3. Treatment effects substantially same with those of Example 1 were obtained. Further, it was ascertained that purging outlet air can be used as fresh air for regenerating.

A combustion system was employed in an apparatus for exhaust gas treatment. It is expected that equipment costs and running cost can also be reduced to the same extent by condensing regenerating air with other systems such as a scrubber system in place of the combustion system.

The meritorious effect of the present invention are summarized as follows.

Application of the method of present invention to dry dehumidifiers requiring exhaust gas treatment makes it possible to condense vapor of a solvent contained in exhaust gas to be treated efficiently to high concentration under the condition of circulating and reusing regenerating gas, so that the scale of using apparatus for exhaust gas treatment can be reduced as well as the total equipment costs and also running cost can be drastically reduced.

In case that a combustion system is employed in an apparatus for exhaust gas treatment, fuel oil additives can be reduced in proportional to the exhaust gas concentration which becomes increased in the present inventive system. Consequently, it is possible to contribute largely also to the suppression of $CO_2$ generation.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

[Explanation of the Reference Numerals]

1: dehumidifying rotor; 2: treating zone; 3: regenerating zone; 4: air heater; 5: fan for regenerating; 6: fan for treating; 7: gas to be treated; 8: dry gas; 9: outside air (fresh air); 10: regenerating air; 11: regenerating outlet air; 12: the atmosphere, exhaust gas treatment and others; 12': exhaust gas treatment; 13: sensible heat exchanger; 14: cooling dehumidifier; 15: condensed water; 16: purging air (fresh air, outside air); 17: purging zone; 18: fan for purging; 19: motor for driving a dehumidifying,rotor; 20: filter for treating; 21: filter for regenerating; 22: purge outlet gas; $Q_1$, $Q_2$, $Q_3$: gas quantity This application is based on Japanese Patent Applications No. 2000-167714 filed on Jun. 5, 2000 and No. 2001-149605 filed on May 18, 2001, which are expressly incorporated herein by reference in their entirety.

What is claimed is:

1. A method for removing moisture from gas containing vapor of a solvent using a dry dehumidifier, comprising:
    cooling a part of regenerating outlet gas of the dehumidifier to remove moisture,
    circulating the dehumidified regenerating outlet gas to reuse as regenerating gas,
    exhausting the residual part of the regenerating outlet gas, and
    subjecting the exhausted gas to removal treatment.

2. The method as defined in claim 1, wherein the residual part of the regenerating outlet gas comprises a high concentration of the vapor of the solvent.

3. A method for removing moisture from gas containing vapor of a solvent using a dry dehumidifier, comprising the steps of:
    (a) provIding the gas containing vapor of the solvent to the dry dehumidifier;
    (b) provIdIng regenerating gas to the dry dehumidifier to produce a dry gas and a regenerating outlet gas;
    (c) condensing vapor of the solvent in the regenerating outlet gas of the dehumidifier to remove the solvent;
    (d) after step (c), cooling a part of the regenerating outlet gas to remove moisture and produce a dehumidified regenerating outlet gas; and
    (e) circulating the dehumidified regenerating outlet gas to reuse as regenerating gas.

4. The method as defined in claim 3, wherein said moisture and partial vapor of the solvent contained in said regenerating outlet gas are removed by cooling at the same time.

5. The method as defined in claim 3, further comprising, adding a small quantity of fresh air to the regenerating gas.

6. The method as defined in claim 3, wherein most of the vapor of the solvent in said gas to be treated is transited into the regenerating gas.

7. The method as defined in claim 5, further comprising, discharging exhaust air in the corresponding quantity of the fresh air from the regenerating gas.

8. The method as defined in claim 3, wherein the solvent is an organic solvent.

9. The method as defined in claim 3, wherein step (c) is performed in a heat exchanger.

10. A method for removing moisture from gas containing vapor of a solvent using a dry dehumidifier, comprising:
    removing moisture from a part of regenerating outlet gas of the dehumidifier,
    circulating the dehumidified regenerating outlet gas to reuse as regenerating gas,
    exhausting the residual part of the regenerating outlet gas, and
    subjecting the exhausted gas to removal treatment.

11. The method as defined in claim 10, wherein the residual part of the regenerating outlet gas comprises a high concentration of the vapor of the solvent.

12. A method for removing moisture from gas containing vapor of a solvent using a dry dehumidifier, comprising the steps of:
    (a) providing the gas containing vapor of the solvent to the dry dehumidifier;
    (b) providing regenerating gas to the dry dehumidifier to produce dry gas and a regenerating outlet gas;
    (c) condensing vapor of the solvent in the regenerating outlet gas of the dehumidifier to remove the solvent;
    (d) after step (c), removing moisture from at least a part of the regenerating outlet gas to produce a dehumidified regenerating outlet gas; and (e) circulating the dehumidified regenerating outlet gas to reuse as regenerating gas.

13. The method as defined in claim 12, wherein the solvent is an organic solvent.

14. The method as defined in claim 12, wherein said dry dehumidifier has a purge zone and purging outlet gas is used as regenerating gas.

15. The method as defined in claim 12, wherein at least. one tenth of said regenerating outlet gas in quantity is circulated and reused.

16. The method as defined in claim 12, wherein step (c) is performed in a heat exchanger.

* * * * *